United States Patent
Oberg et al.

(10) Patent No.: US 7,479,904 B1
(45) Date of Patent: Jan. 20, 2009

(54) FILTER DRIVEN DC-FREE CODE

(75) Inventors: Mats Oberg, Cupertino, CA (US); Pantas Sutardja, San Jose, CA (US); Gregory Burd, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/729,747

(22) Filed: Mar. 29, 2007

Related U.S. Application Data

(63) Continuation of application No. 10/765,431, filed on Jan. 26, 2004, now Pat. No. 7,298,294, which is a continuation-in-part of application No. 10/155,777, filed on May 24, 2002, now Pat. No. 6,917,313.

(60) Provisional application No. 60/349,895, filed on Jan. 16, 2002, provisional application No. 60/352,776, filed on Jan. 28, 2002.

(51) Int. Cl.
*H03M 5/00* (2006.01)

(52) U.S. Cl. .......................................... 341/58; 341/87

(58) Field of Classification Search .................. 341/58, 341/87, 94, 95, 68; 386/112, 109
See application file for complete search history.

(56) References Cited

U.S. PATENT DOCUMENTS

| | | | |
|---|---|---|---|
| 4,027,335 A | 5/1977 | Miller | |
| 4,775,985 A | 10/1988 | Busby | 375/242 |
| 4,833,471 A * | 5/1989 | Tokuume et al. | 341/67 |
| 5,192,949 A * | 3/1993 | Suzuki et al. | 341/68 |
| 5,198,813 A | 3/1993 | Isozaki | |
| 5,341,134 A | 8/1994 | Benjauthrit | |
| 5,396,239 A * | 3/1995 | McMahon et al. | 341/58 |
| 5,469,162 A | 11/1995 | Chaki et al. | |
| 5,477,222 A | 12/1995 | Kahlman et al. | |
| 5,506,581 A | 4/1996 | Ino et al. | |
| 5,508,701 A | 4/1996 | Nose et al. | |
| 5,608,397 A | 3/1997 | Solijanin | |
| 5,699,061 A | 12/1997 | Shimpuku | |
| 5,754,587 A | 5/1998 | Kawaguchi | |
| 5,774,078 A * | 6/1998 | Tanaka et al. | 341/68 |
| 5,854,596 A | 12/1998 | Schouhamer Immink | |

(Continued)

OTHER PUBLICATIONS

U.S. Appl. No. 10/765,431, filed Jan. 26, 2004, Oberg et al.
U.S. Appl. No. 11/155,777, filed May 24, 2002, Tokunou.

*Primary Examiner*—Brian Young

(57) ABSTRACT

An encoder comprises a buffer that stores data associated with a communication signal. A DC-Check circuit generates a metric as a function of the data. A DC tracking block generates an invert signal as a function of the metric. An inverter unit controls an inverter bit of an output of the buffer based on the invert signal such that an average DC value of the data approaches zero. The metric is selected from a group consisting of a maximum absolute value of a running digital sum of the data, a maximum DC offset introduced by a filtering operation, a maximum DC offset of a DC correction circuit, a maximum absolute value of a filtered output of the data, a maximum DC offset slope change of the running digital sum of the data, a count of the quantity of times the metric is above or below a threshold, and combinations thereof.

17 Claims, 8 Drawing Sheets

U.S. PATENT DOCUMENTS

| | | |
|---|---|---|
| 5,929,794 A | 7/1999 | Hayakawa et al. |
| 6,175,317 B1 | 1/2001 | Ordentlich et al. ............ 341/58 |
| 6,265,994 B1 | 7/2001 | Kahlman |
| 7,006,016 B1 | 2/2006 | Feng |
| 2005/0244003 A1 | 11/2005 | Nagai et al. ................. 380/201 |
| 2006/0181439 A1 | 8/2006 | Varanasi et al. |

* cited by examiner

FILTER DRIVEN DC-FREE CODE

CROSS-REFERENCE TO RELATED APPLICATIONS

This application is a continuation of U.S. application Ser. No. 10/765,431, filed Jan. 26, 2004 (now U.S. Pat. No. 7,298, 294, issued Nov. 20, 2007), which is a continuation-in-part of U.S. application Ser. No. 10/155,777, filed May 24, 2002 (now U.S. Pat. No. 6,917,313, issued Jul. 12, 2005), which claims the benefit of the filing date of U.S. Provisional Application Nos. 60/349,895, filed Jan. 16, 2002, and 60/352,776, filed Jan. 28, 2002, the content of each of which is herein incorporated by reference in its entirety.

TECHNICAL FIELD

This invention relates to block coding for communication signals.

BACKGROUND

Communication systems generally employ modulation coding to convert data bits into symbols that are optimized for transmission through the communication channel. Modulation coding can be used to ensure the presence of sufficient information for timing recovery, gain control, and adaptive equalization. Some communication channels such as perpendicular recording channels may inherently include a DC component in the read back signal. The DC component may complicate and degrade the decoding of the signal requiring tracking of the DC offset. In some cases, the performance of DC offset tracking circuits may degrade by as much as two dB in comparison to the average case.

SUMMARY

In one aspect, a modulation code is presented that minimizes data patterns that may inhibit the performance of a DC offset tracking loop. An encoder for encoding a communication signal with the modulation code includes a signal buffer to buffer data associated with the communication signal. A DC-Check circuit to compute a metric as a function of the data. A DC tracking block to generate a flip signal as a function of the metric, the flip signal having a flip state and a nonflip state. A flip unit, responsive to the flip signal, to control a flip bit of an output of the signal buffer such that an average DC value of the data approaches zero.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
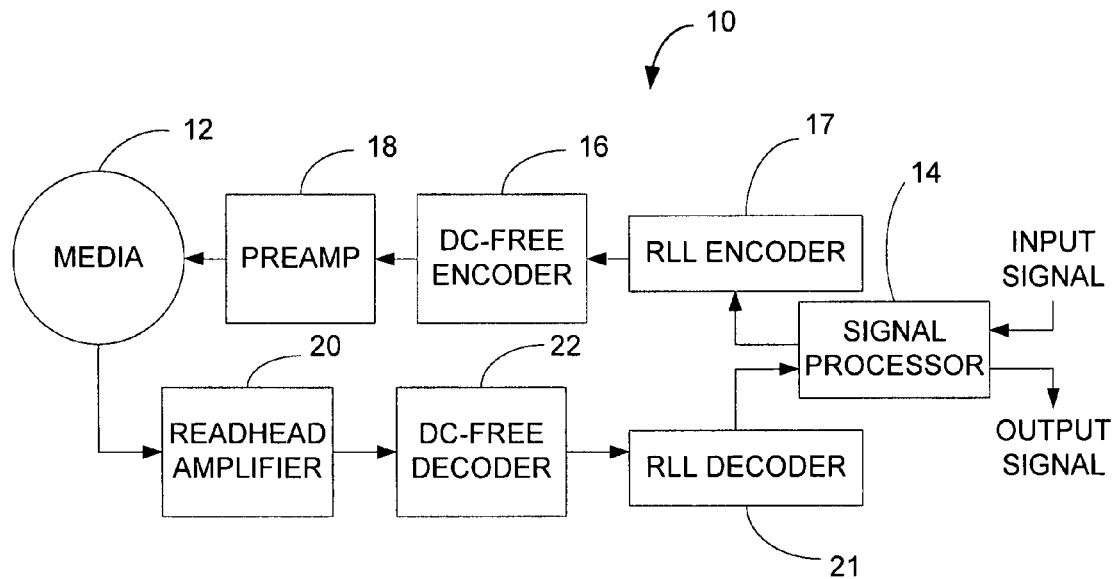
FIG. 1 is a block diagram of an aspect of a hard disk assembly.

FIG. 1 shows a storage assembly 10 for storing data. The storage assembly 10 includes media 12 to which data may be written and read. Perpendicular recording is preferably employed to write and read data to the media 12 and may be included in any known storage device such as hard drives and optical disks. In a writing operation, a signal processor 14 may apply compression and error correction schemes to an input signal. An RLL encoder 17 converts the processed input signal to a format suitable for storage by the storage unit 12. A DC-free encoder 16 employs an encoding scheme to control DC offset in the read back signal when perpendicular recording is used for writing the signal to the media 12. The DC-free code implemented by the encoder 16 may locally limit the average DC level over an interval extending beyond one codeword, one sector, or any portion of the communication over which the code is applied. The code rate may be $L/(L+1)$ and the error propagation due to a DC free decoder 22 is about 1 bit for some aspects. The code may preserve an RLL constraint. A preamp 18 amplifies and writes the encoded signal to the media 12. A readhead amplifier 20 detects and generates the read back signal by reading data from the media 12. The readhead amplifier 20 may include a read equalizer and detector for equalizing and detecting the data. The read back signal may be decoded by the DC-free decoder 22 that is suitable for decoding signals that are encoded by the DC-free encoder 16. An RLL decoder 21 may decompress the decoded signal. The signal processor 14 may apply error correction to the decompressed signal to generate an output signal representing the recovered data.

Figure 2:
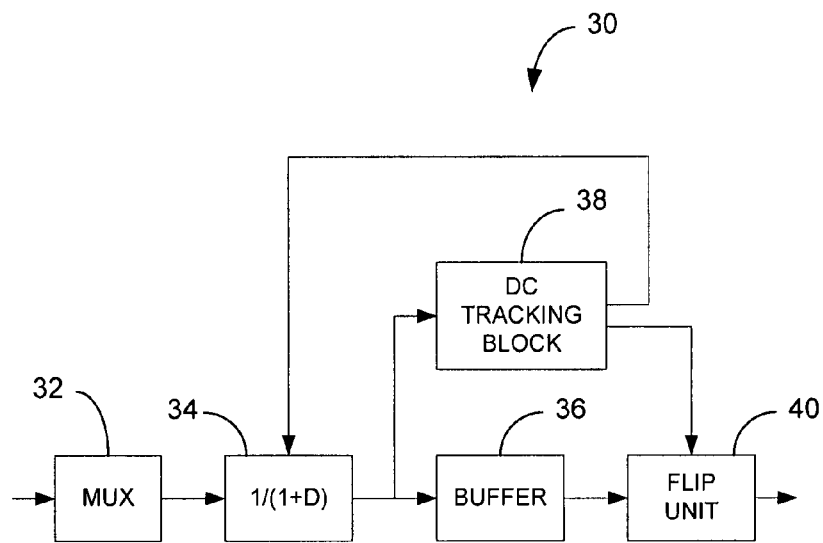
FIG. 2 is a block diagram of an aspect of an encoder.

FIG. 2 shows an encoder 30 to apply dc-free modulation code to a communication signal. The communication signal may be any signal that communicates information between two assemblies, although the invention is particularly suitable when applied to communication signals that inherently have a DC component such as signals associated with perpendicular recording of storage devices. The encoder 30 may include a multiplexer 32 to insert a zero bit into the first position of the communication signal to form a codeword c(0:L). A precoder 34 precodes the codeword with $1/(1+D)$. A buffer 36 stores the precoded output from the precoder 34. The buffer 36 may be any type of buffer such as a first-in-first-out (FIFO) buffer. A DC tracking block 38 computes the DC component associated with the first half of the codeword and generates a flip signal based on the computation and the DC component of the second half of the previous codeword. A flip unit 40, in response to the flip signal, may flip the output of the buffer 36 or output the buffer output unflipped. The DC tracking block 38 may also generate a state signal to cause the precoder 34 to flip state before processing the second half of the codeword. The state signal may be active in response to the flip signal causing the buffer output to be flipped.

Figure 3:
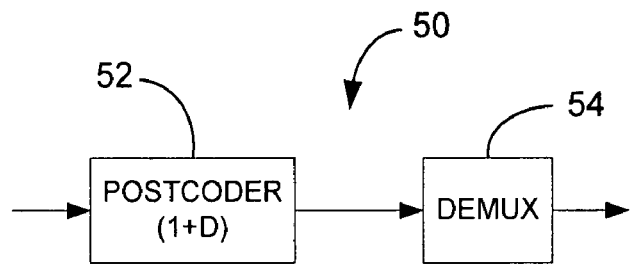
FIG. 3 is a block diagram of an aspect of a decoder

FIG. 3 shows a DC-free decoder 50 to decode a communication signal that is encoded with DC-free code. The DC-free decoder 50 includes a postcoder 52 to postcode the communication signal. The postcoder 52 preferably postcodes the signal with "1+D". A demultiplexer 54 strips off the first bit of each codeword that is postcoded to recover the data that was encoded.

Figure 4:
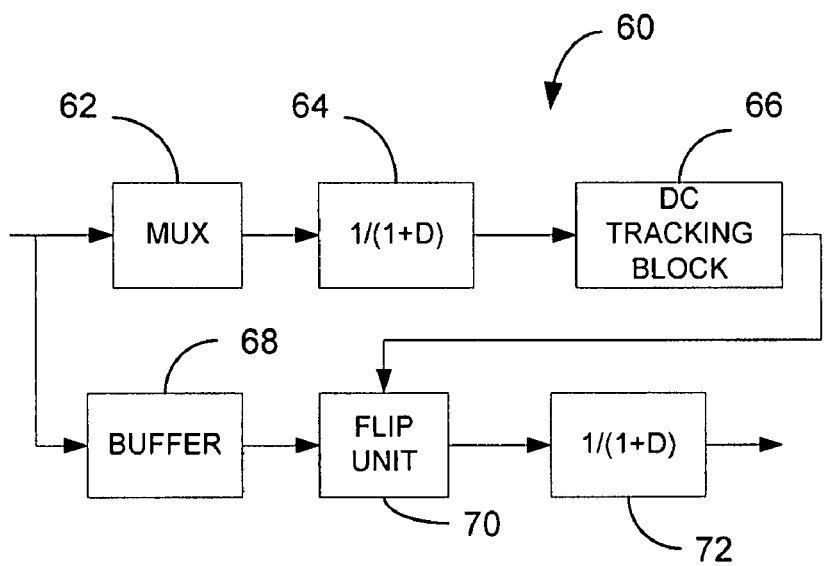
FIG. 4 is a block diagram of an aspect of an encoder.

FIG. 4 shows another DC-free encoder 60 for encoding a communication signal. The communication signal preferably includes Run Length Limited (RLL) encoding although RLL encoding is not required. A multiplexer 62 and buffer 68 both receive the RLL encoded signal. The multiplexer 62 inserts a zero bit into the communication signal to form a codeword. A first precoder 64 precodes the codeword with 1/(1+D). A DC tracking block 66 computes the DC component associated with the first half of the codeword and generates a flip signal based on the computation and the DC-level in the second half of the previous codeword. The buffer 68 stores the received communication signal. The buffer 68 may be any type of buffer such as a FIFO buffer. A flip unit 70 receives the output of the buffer 68 and, in response to the flip signal, inserts a 1 or 0 into the buffer output to form a codeword. A second precoder 72 precodes the codeword with 1/(1+D).

Figure 5:
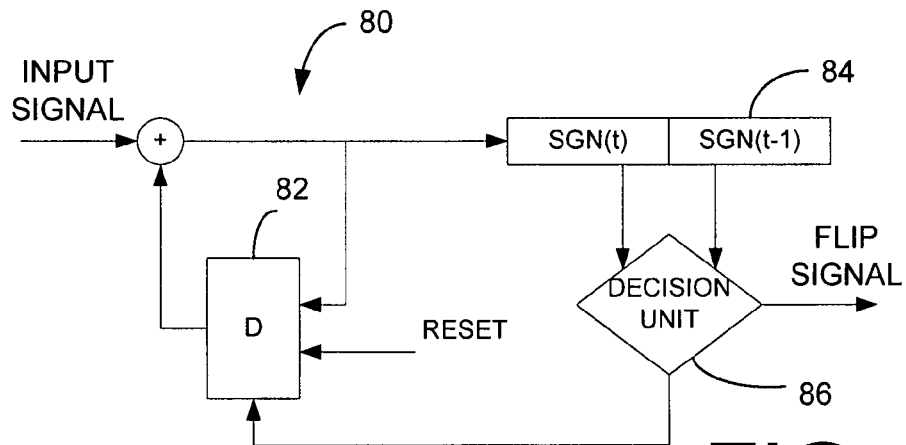
FIG. 5 is a block diagram of an aspect of a DC tracking block.

FIG. 5 shows a DC tracking block 80 for computing the DC component of a communication signal. The DC tracking block 80 may compute the DC component over any portion of the communication signal including a half codeword, a full codeword, and a sector. The output of a feed back loop, dc(t), is sampled at time $t_k = k*[(L+1)/2]$, k=1, 2 . . . and the sign, $sgn(2dc(t_k)-[(L+1)/2])=sgn(t_k)$, is stored in a register 84. The sampling times may correspond to the middle and end of each dc free codeword. An accumulator 82 of a feed back filter may be reset to zero following each sampling time. A decision unit 86 may determine whether to flip the n-th code-word n=1, 2, 3 . . . after $sgn(t_{2(n-1)+1})$ becomes available. In that instance the decision to flip is made if $sgn(t_{2(n-1)+1})=sdc(t_{2(n-1)})$; otherwise we do not flip. If the decision to flip is made, then the state signal is generated to flip the precoder state and sgn $(t_{2(n-1)+1})$ is inverted to $-sgn(t_{2(n-1)+1})$ to account for the change in DC when the codeword is flipped (or inverted).

Figure 6:
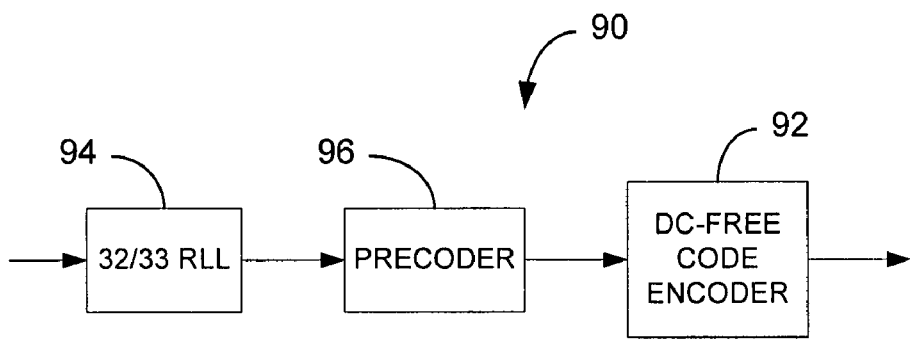
FIG. 6 is a block diagram of an aspect of an encoder.

FIG. 6 shows a communication system 90 including a 33/34 DC-free encoder 92 for encoding a communication signal. The input bits of the communication system 90 may first be passed through a 32/33 RLL encoder 94. The 32/33 code in the example is designed in the interleaved non-return to zero invert (INRZI) domain, the data may then be passed through a 1/(1+D) precoder 96 to convert the codeword into non-return to zero invert (NRZI) domain. Finally, the 33/34 dc-free encoder 92 is used to limit the DC fluctuations of the coded data. The RLL constraint of the code may be (0, 23/15).

Figure 7:
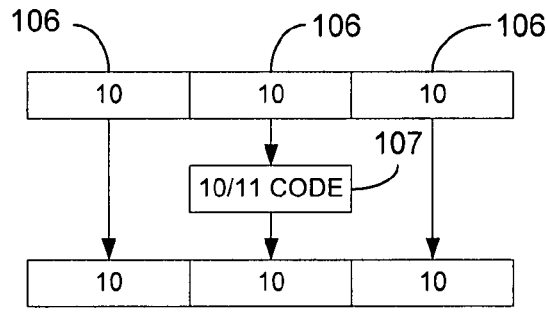
FIG. 7 is a block diagram of an aspect of a 30/31 RLL encoder.
Figure 8:
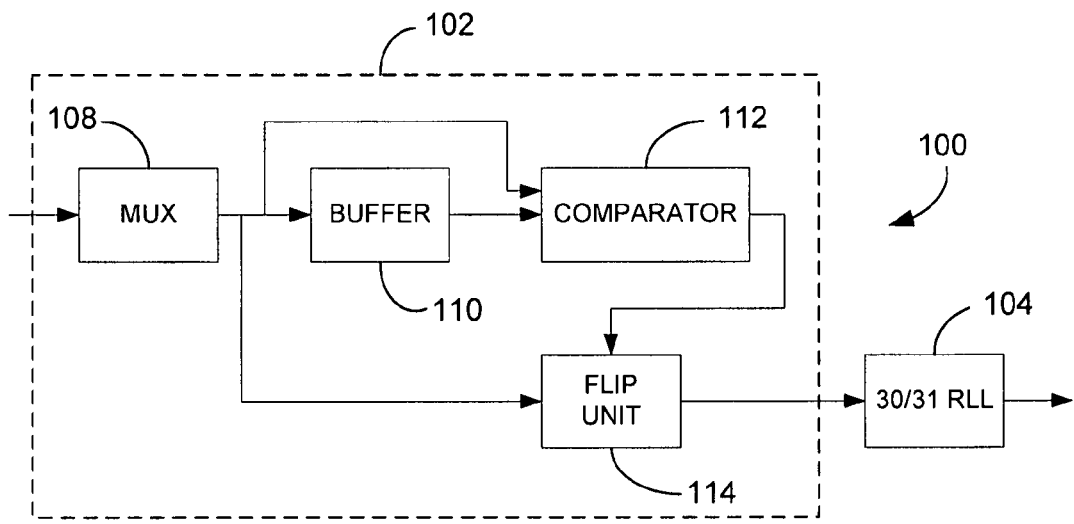
FIG. 8 is a block diagram of an aspect of an encoder.

FIGS. 7 and 8 show another communication system 100 including a 30/31 dc-free encoder 102 to encode a communication signal. The DC limited code implemented in the 30/31 dc-free encoder 102 may be used with 30/31 non-return to zero (NRZ) RLL code. Since 30/31 code is typically constructed in NRZ domain, the construct for the DC limited code shown in FIGS. 2-6 may not be preferable since the dc-free code shown in FIGS. 2-6 operates in NRZI. Using the code construct shown in FIGS. 2-6 with 30/31 NRZ RLL code may cause error propagation. Therefore, the construct shown in FIGS. 7 and 8 may be advantageous when employed with RLL code designed in the NRZ domain.

30/31 RLL code generally is designed in NRZ domain and does not have error propagation across 10-bit Error Correction Circuit (ECC) byte boundaries. An RLL encoder 104 takes in three 10-bit symbols 106 and encodes the middle one with 10/11 RLL code 107, where the encoding depends on the last two bits of the first symbol (however these bits are not altered by the encoder).

The 30/31 dc-free encoder 102 may include a multiplexer 108 to take in 30 bits, w(0:29), and form a 31-bit codeword c=(0,w) by inserting a 0 at the beginning. A buffer 110 stores a portion of the codeword. A comparator 112 may then compare the dc content of the last 10 bits of the previous codeword with the dc content of the first 11 bits of the current one. If these quantities have the same sign, a flip unit 114 may flip the first 11 bits of the current codeword. Next, c(1:30) is sent to the 30/31 RLL encoder 104 to be encoded. The 30/31 dc-free code has no error propagation across ECC symbol boundaries while preserving the RLL constraint of the 30/31 code. In addition, the DC content in 2 bytes spanning the last byte of previous codeword and the first byte of the current codeword is controlled. The DC content of the middle byte may also be controlled by RLL constraints imposed by the 10/11 RLL code.

Figure 9:
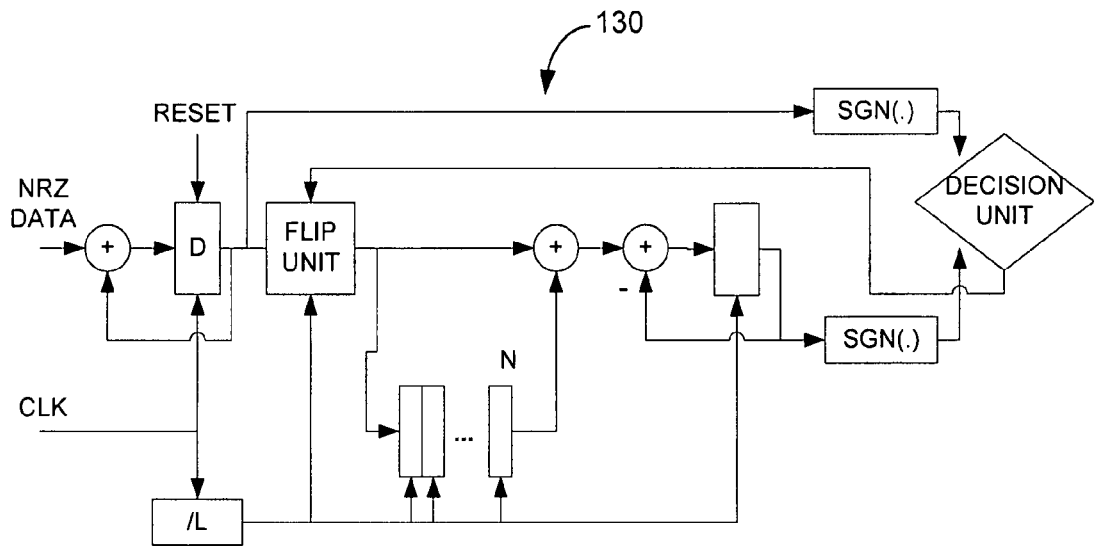
FIG. 9 is a block diagram of an aspect of a DC tracking block.
Figure 10:
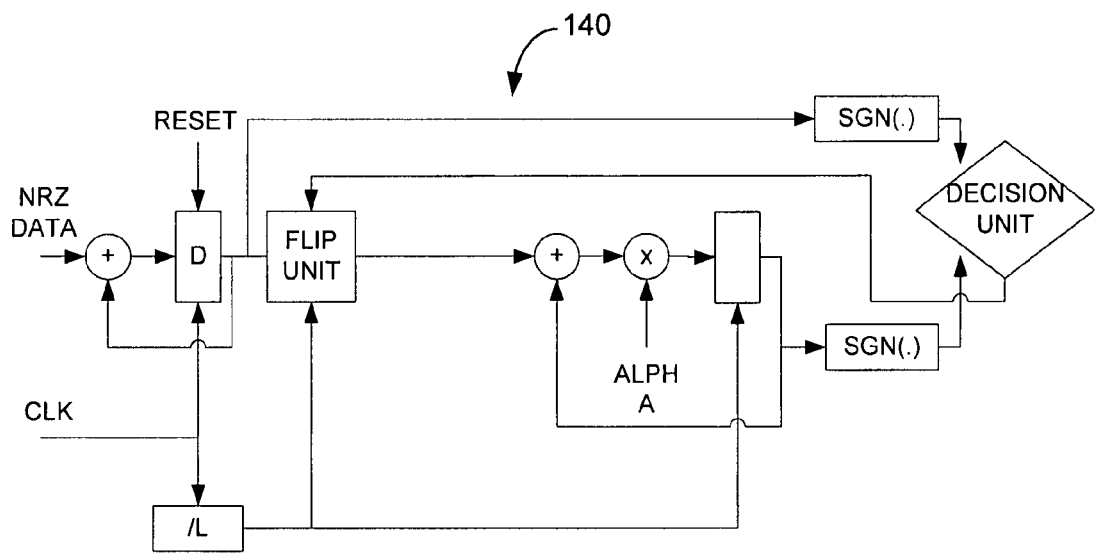
FIG. 10 is a block diagram of an aspect of a DC tracking block.
Figure 11:
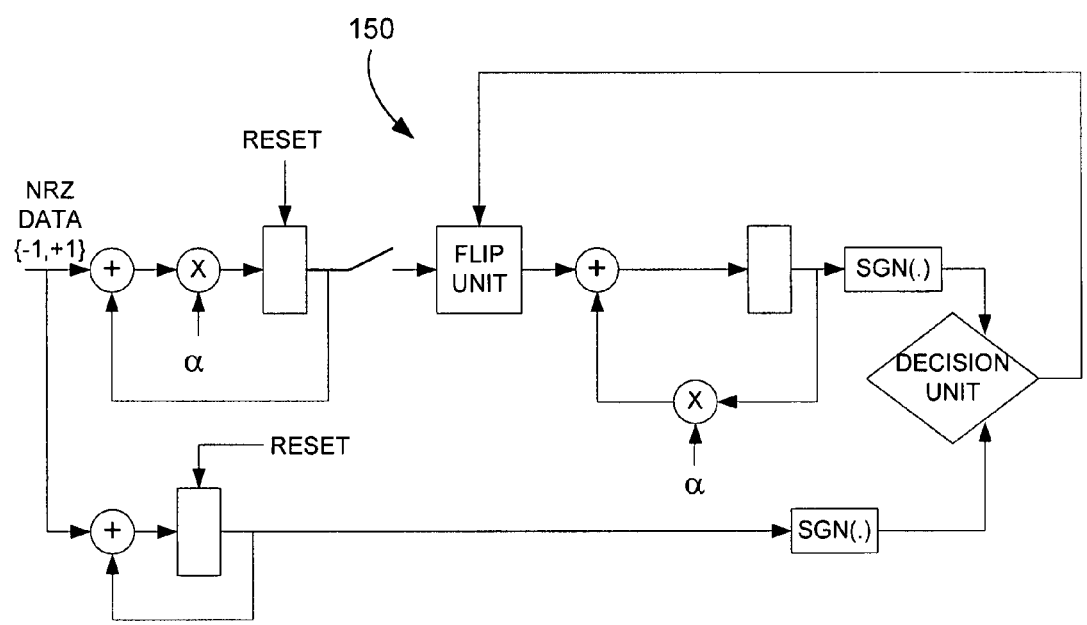
FIG. 11 is a block diagram of an aspect of a DC tracking block.

FIGS. 9-11 each show aspects of DC tracking blocks that are not limited to operating on specific types of code such as 32/33 code and 30/31 code.

FIG. 9 shows an aspect of a DC tracking block 130 that takes the DC level of a current code-word and compares it with the accumulated DC-level of the n last codewords.

FIG. 10 shows another aspect of a DC tracking block 140 that uses a weighted average of the DC level of previous codewords and compares that to the DC level of a current codeword. In one aspect, the weighting may be exponentially decreasing for older codewords. For example, when codeword i is the current codeword, then the weighting for codeword k, k<i, will be $a^{i-k}$, for 0<a<1. The extension to individual weights for codewords j codewords prior to the current is straightforward, up to a predetermined number of codewords.

FIG. 11 shows another aspect of a DC tracking block 150 that uses a weighted average of bits, rather than codewords. The DC level of the current codewords is compared to a weighted average of previous codesymbols, using weights that may be exponentially decreasing. The weighted average of all the codesymbols prior to the current codeword may be computed in two steps. First the weighted average of each individual codeword may be computed by accumulator A as the bits arrive. At the end of each codeword, the accumulator value may be passed to accumulator B, and accumulator A is reset. If the codeword is flipped, then the accumulator A value may be inverted prior to being passed to accumulator B. Using this two step process may simplify the handling of flipped codewords.

Figure 12:
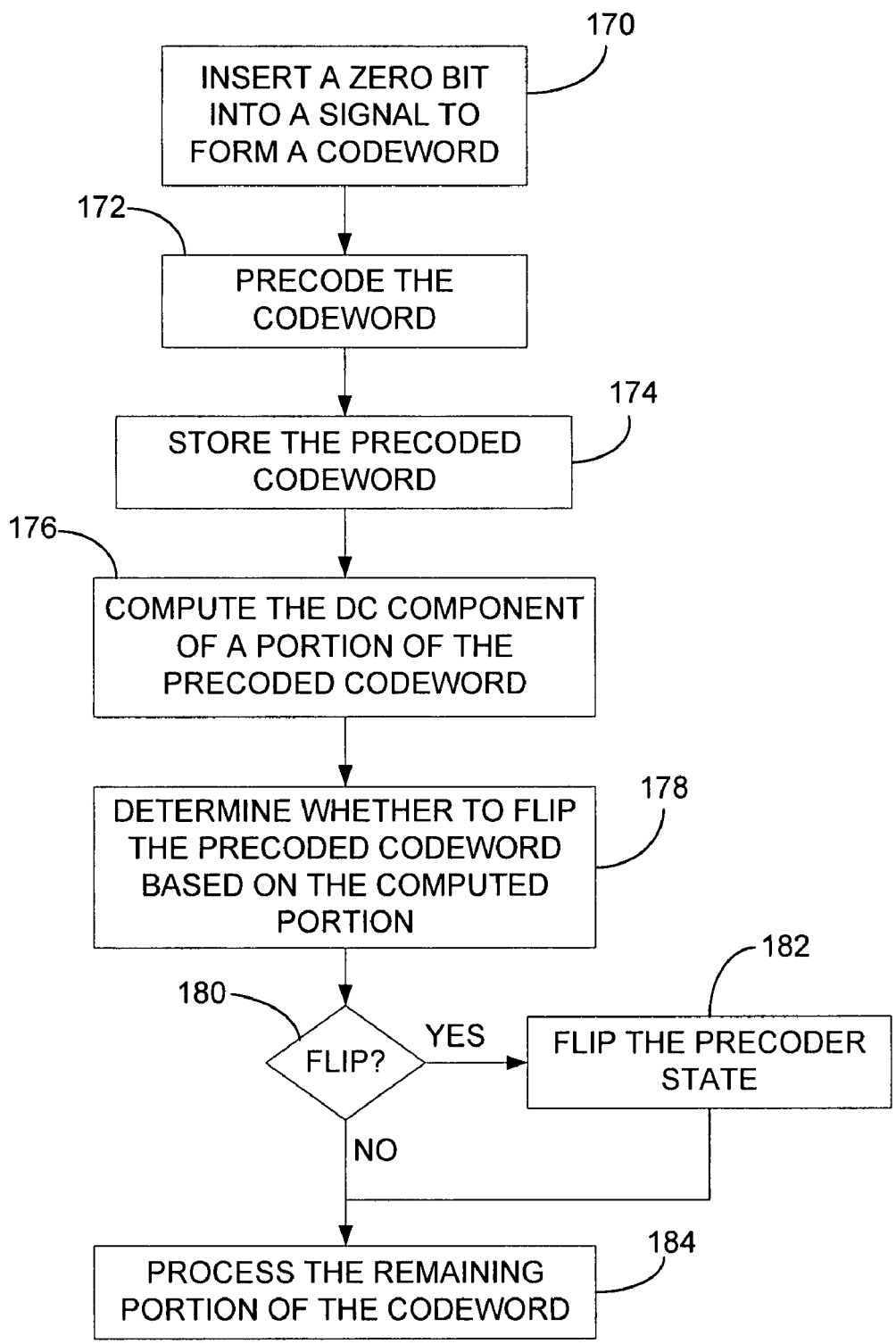
FIG. 12 is a flow diagram of an aspect of an encoding scheme.

FIG. 12 shows a process of encoding a communication signal. Beginning at block 170, a codeword c(0:L) is formed by inserting a zero bit, c=(0,w), into an input w(0:L−1). Continuing at block 172, the codeword may be precoded with a 1/(1+D) precoder. At block 174, the precoded codeword may be stored in a buffer. At block 176, the DC component of a portion of the precoded codeword may be computed. Based on the computed portion, a determination is made whether to flip the codeword and whether all or a portion of the codeword should be flipped, block 178. Continuing to blocks 180 and 182, if all or a portion of the codeword is to be flipped, then the precoder state is flipped. Alternatively continuing to block 180, if the codeword is not flipped, then control passes to block 184 at which the remaining portion of the codeword is processed.

Figure 13:
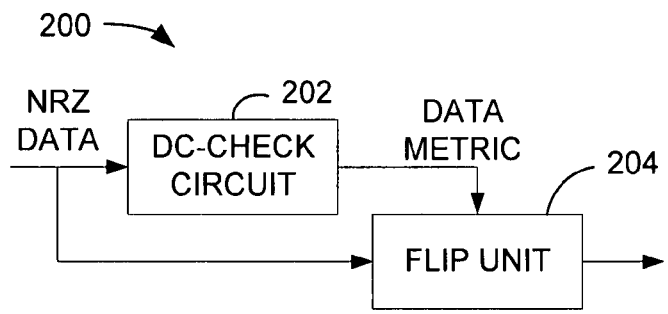
FIG. 13 is a block diagram of an aspect of a DC limited encoder.

FIG. 13 shows an encoder 200 to encode a communication signal. The encoder 200 includes a DC-Check circuit 202 to compute one or more metrics as a function of NRZ data. A flip unit 204 may select the value of a flip bit as a function of the data metrics. Also, a decoder (not shown) may include the DC-Check circuit 202 to decode data. The data metrics may include, but are not limited to 1) limiting the maximum of the absolute value of the running digital sum, 2) limiting the maximum DC offset introduced by some filtering operation, 3) the same as metric #2 except including a DC correction circuit, 4) limiting the maximum absolute value of the filtered output with or without a correction circuit, 5) limiting the maximum DC offset slope change, with or without a DC correction circuit and, 6) similar to 1-5 above, but observing the number of times the values are above and/or below a threshold. The DC-Check circuit 202 may be implemented in any manner including hardware, software, firmware, and combinations thereof.

Figure 14:
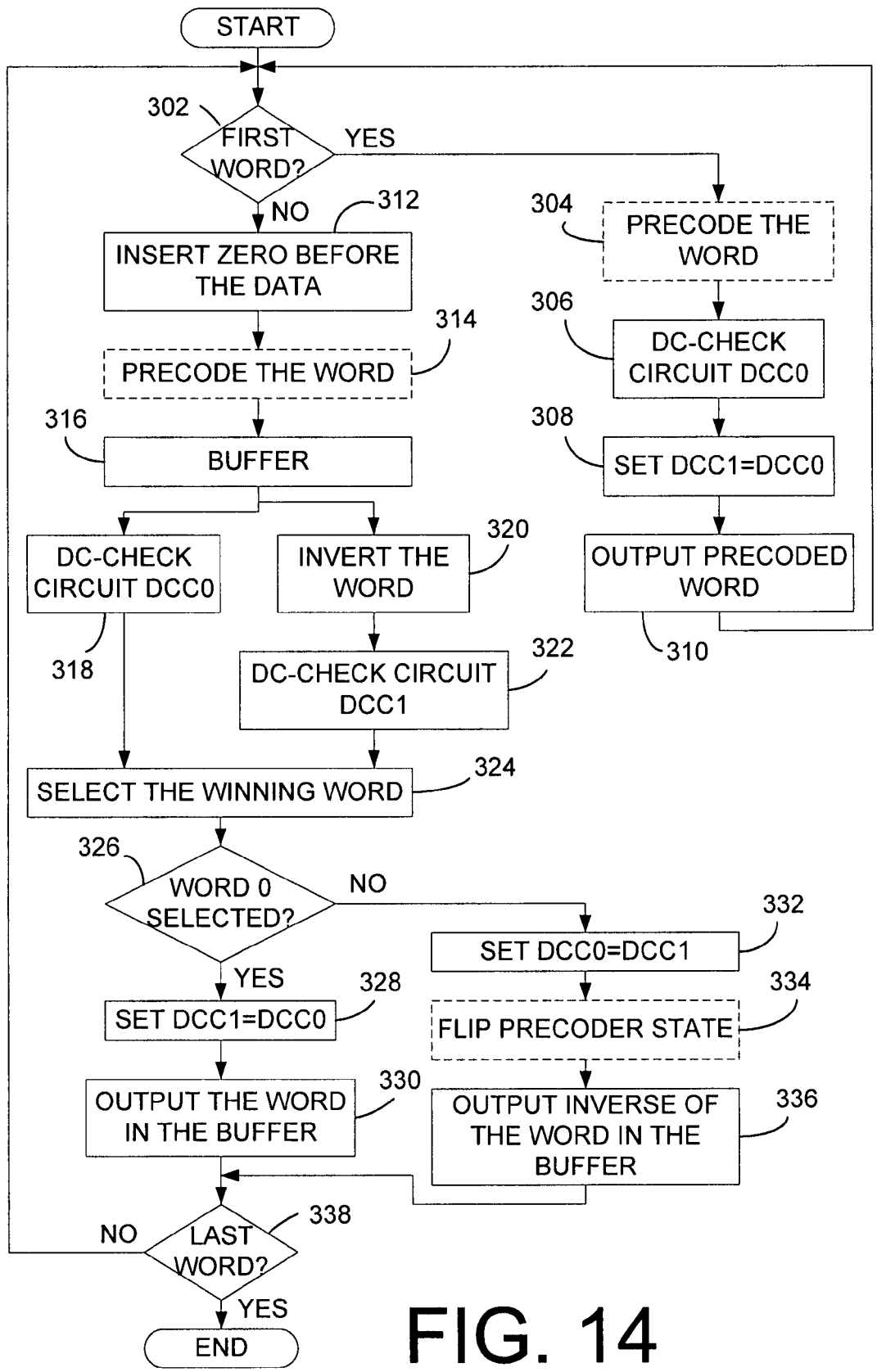
FIG. 14 is a flow diagram of an aspect of bit insertion and scheduling in a DC limited encoder.

FIG. 14 shows a flow diagram for bit insertion and scheduling in a DC limited encoder such as encoder 200. The DC limited encoder may insert a flip bit after every k input bits for a code rate of k/(k+1). The encoder input may be encoded such as in either NRZI, or NRZ domain. If the input is in NRZI domain, the encoder may precode the sequence before further processing. The criteria for selecting the value of the current flip bit may include past encoder outputs as well as different possible future encoder outputs. The future outputs may include the current flip bit, but they may also include more than one flip bit. First the case with only one flip bit in the possible future outputs will be described, then a general description with more than one flip bit will be described.

Two DC-Check circuits, DCC0 and DCC1, may be used for the case where there is only one flip bit in the possible future outputs. Starting at decision block 302, the data prior to the first codeword may be passed through DC-Check circuit 0, DCC0. The DC-Check Circuit 0 may compute one or more metrics as a function of the data. When the first data word enters the DC limited encoder, the word may be passed through the precoder (if applicable), block 304. For example, if the input is in NRZI domain, the sequence may be passed through the precoder before further processing. At block 308, the state of DCC1 is set to be the same as DCC0. Continuing to block 310, the precoded word is passed to the output buffer.

Returning to decision block 302, the next word is passed to the encoder. At block 312, a 0 is inserted in front of the word, and at block 314 the new word may be passed through the precoder (if applicable), such as to precode data that is in the NRZI domain. At block 316, the new word may be buffered in a buffer. At block 318, the new word may be passed to DCC0, and at blocks 320 to 322 the binary complement of the new word may be determined and passed to DCC1. The DC-Check Circuit 1, DCC1, may compute one or more metrics as a function of the binary complement of the new word. At block 324, the output of DCC0, word 0, and the output of DCC1, word 1, are compared and one of the words is selected based on the comparing. At decision block 326, the processing flow for the selected word is determined based on which word is selected. At blocks 328 to 330, if the output of DCC1 (word 0) is the selected one of the DC Check Circuit outputs, then the state value of DCC1 is set equal to the state value of DCC0 and the word in the buffer is passed to the encoder output. At blocks 332 to 336, if the output of DCC1 (word 1) is better, the state value of DCC0 is set equal to the state value of DCC1, the precoder state may be inverted (if applicable), and the inverse of the word in the buffer is passed to the encoder output. At decision block 338, the loop continues until the last word has been encoded.

In this section, the case when the value of a flip bit is based on future data containing at least one more flip bit is described. When a single flip bit is used as described in FIG. 14, two sequences may be generated, and one of the two sequences may be selected. For each extra flip bit, the number of sequences to choose from doubles and the number of DC-Check circuits doubles. For example with two extra flip bits for a total of 3 flip bits, 8 sequences may be generated and 8 DC-Check circuits employed. Each of the sequences may be passed into its corresponding DC-Check circuit. Generally, only the value of the first flip bit will be chosen. If the sequence with the best output from DCCi (where i denotes which DC-Check circuit) is chosen, it might turn out to be a less desirable choice if future choices of flip bits are different from what that particular sequence had. In other words, if a flip bit, fk, at time k is chosen assuming a certain value of flip bits fk+1 and fk+2, and the selected value of flip bit at time k+1 (fk+1) is different from the assumption, the choice at time k might not be the best any longer. Therefore, the flip bit at time k is preferably selected assuming the worst possible choice of any future flip bit parts of the sequences used in selecting flip bit fk. For each pair of sequences that differs in the last word, the one with the worst metric for the last word is preferably selected as the survivor, and the other sequence is discarded. Then each pair of sequences that differ in the last two words may be compared, and the one with worst metric may be selected. This continues until there are only two sequences left, and the one with the best metric is selected. The DC-Check circuit states are then set to correspond to the sequences that begin with the selected sequence.

In one aspect, a DC-Check circuit may limit the maximum of the absolute value of a running digital sum. The running digital sum (RDS(n)) may be defined as the sum of encoder outputs up to time n. Assuming the encoder outputs, x, are 0,1; RDS(n) may be defined as follows:

$$RDS(T_0, n) = \sum_{i=T_0}^{n} (2x_i - 1), \text{ where } (-\infty < T_0 < 0) \quad \text{EQ. 1}$$

$RDS(T_0,n)=RDS(T_o,-1)+RDS(0,n)$
and,
$RDS0=RDS(T_o,-1)$

The flip bit (precoded if applicable) may have a value which should be determined as xo. The state of the DC-Check circuit before new data is entered is defined to be RDS0. The output from DCCi for an input sequence may be given as follows:

$$RDS\max = \max_{0 \leq n \leq k} \left( \left| \sum_{i=0}^{n} (2x_i - 1) + RDS0 \right| \right) \quad \text{EQ. 2}$$

Figure 15:
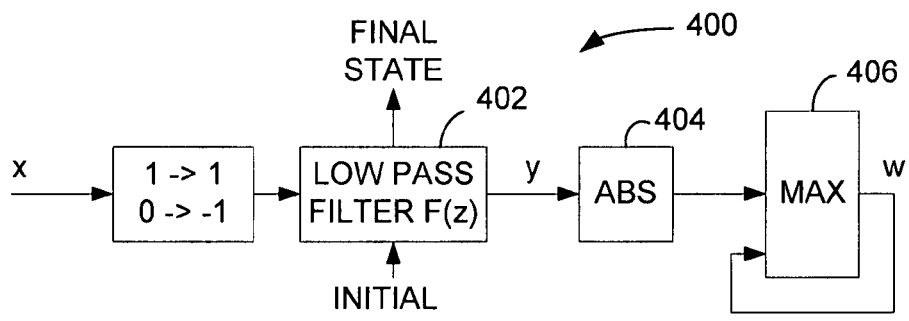
FIG. 15 is a block diagram of an aspect of a DC-Check circuit.

FIG. 15 shows an aspect of another DC-Check circuit 400. The DC-Check circuit 400 may limit the maximum DC offset introduced by some filtering operation. The main source of baseline wander in many systems is from AC coupling circuits, or other high pass filtering circuits. The DC-Check circuit 400 may estimate the amount of baseline wander caused by a code sequence. In one aspect, the DC-Check circuit 400 may pass the sequence through a model of the high pass filter, and subtract the output of the filter from the input sequence. In another aspect shown in FIG. 15, the DC-Check circuit 400 may pass the code sequence, x, through a low pass filter 402 with a transfer function that complements the high pass filter. For example, if the high pass filter model has transfer function H(z), then the low pass filter should have transfer function F(z)=[I−H(z)], 402, with a filter output, y. In each of these aspects, the state of the DC-Check circuit 400 is approximately the same as the filter state. An absolute value module 404 may determine the absolute value of y. A maximum determiner 406 may determine a maximum output, w, that is the largest absolute value of the low pass filter output, y, for the input sequence xo, xl, . . . , xk.

Figure 16:
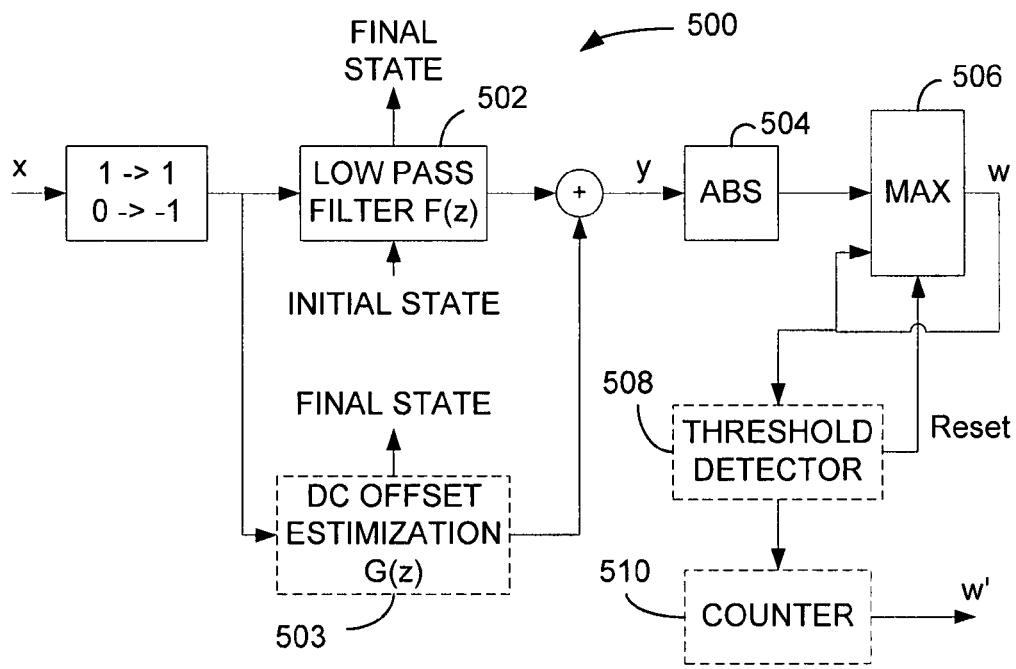
FIG. 16 is a block diagram of an aspect of another DC-Check circuit.

FIG. 16 shows another aspect of a DC-Check circuit 500 for a channel detector that may include a DC correction circuit. The DC-Check circuit 500 may model DC correction in addition to modeling DC offset. By modeling the DC correction, the encoder may select the sequence that gives the smallest DC offset after correction. Assuming that the DC correction in the channel detector is delayed with respect to the actual DC offset, then the correction circuit can be modeled by a low pass filter 502 similar to the low pass filter 402 shown in FIG. 15, but with some delay. Here the state of the DC-Check circuit 500 may be given by the state of the low pass filter 502 and the state of an offset estimation filter 503. An absolute value module 504 may determine the absolute value of y. A maximum determiner 506 may determine a maximum output, w, that is the largest absolute value y, for the input sequence xo, xl, . . . , xk. Any technique for modeling the DC correction circuit may be used.

In another aspect, the DC-Check circuit 500 may limit the number of times an RDS is above a threshold or below another threshold. In addition, threshold limiting may be applied to any type of RDS technique such as limiting the maximum of the absolute value of an RDS, and limiting the maximum DC offset introduced by some filtering operation. For example, the DC-Check circuit 500 may limit the number of times the maximum of an absolute value of the RDS occurs. A threshold detector 508 may compare the RDS to a predetermined value and generate a detect output as a function of the comparison. The detect output may indicate the RDS is either above or below a threshold value. A counter 510 may count the number of times the RDS is either greater than a threshold, or the number of times the RDS is less than a threshold. Instead of using EQ. 2 to determine RDS, the following equations may be used:

$$L = \max\left(\sum_{i=0}^{n} I_i^N, \sum_{i=0}^{n} I_i^P\right), \text{ where}$$

$$I_i^P = \begin{cases} 1 & \text{if } RDS(i) > t_P \\ 0 & \text{Otherwise} \end{cases}$$

$$I_i^N = \begin{cases} 1 & \text{if } RDS(i) > t_N \\ 0 & \text{Otherwise} \end{cases}$$

and $t_p$ and $t_N$, are the positive and negative thresholds. In one aspect L may be kept small. In another aspect, for filtered systems such as shown in FIGS. 15 and 16, the filter outputs, y, may be used instead of RDS.

In another aspect, a DC-check circuit may limit the maximum slope change of any of the described measuring techniques such as the limiting DC offset technique, the maximum of the absolute value of an RDS, limiting the maximum DC offset introduced by some filtering operation, with or without a DC correction circuit, and combinations thereof. For example, in one aspect the DC-check circuit may determine the slope change spanning more than a number k of bits as follows:

$$i, \max_{\Delta > k}\left(\left|\frac{RDS(i) - RDS(i - \Delta)}{\Delta}\right|\right)$$

A number of embodiments of the invention have been described. Nevertheless, it will be understood that various modifications may be made without departing from the spirit and scope of the invention. Accordingly, other embodiments are within the scope of the following claims.

What is claimed is:

1. An encoder, comprising:
   a buffer that stores data associated with a communication signal;
   a DC-Check circuit that generates a metric as a function of the data;
   a DC tracking block to generate an invert signal as a function of the metric, wherein the invert signal has an inverted state and a non-inverted state; and
   an inverter unit that controls an inverter bit of an output of the buffer based on the invert signal such that an average DC value of the data approaches zero,
   wherein the metric is selected from a group consisting of a maximum absolute value of a running digital sum of the data, a maximum DC offset introduced by a filtering operation, a maximum DC offset of a DC correction circuit, a maximum absolute value of a filtered output of the data, a maximum DC offset slope change of the running digital sum of the data, a count of the quantity of times the metric is above or below a threshold, and combinations thereof.

2. The encoder of claim 1 wherein the inverter bit is inserted after every k input bits of the data.

3. The encoder of claim 1 wherein there are two DC Check circuits corresponding to each inverter bit.

4. The encoder of claim 1 further comprising a precoder that generates the data from the communication signal.

5. The encoder of claim 1 wherein the data includes sectors and the metric is a function of the data sectors.

6. The encoder of claim 1 wherein the data includes codewords and the metric is a function of the data codewords.

7. An encoder, comprising:
   a buffer that stores data associated with a communication signal;
   a DC-Check circuit that computes a metric as a function of the data;
   a DC tracking block that generates an invert signal as a function of the metric, wherein the invert signal has an inverted state and a non-inverted state; and
   an inverter unit that controls an inverter bit of an output of the signal buffer based on the invert signal such that an average DC value of the data approaches zero, wherein the data includes past encoder outputs and possible future encoder outputs.

8. An encoder, comprising:
   a buffer that stores data associated with a communication signal;
   a DC-Check circuit that computes a metric as a function of the data;
   a DC tracking block that generates an invert signal as a function of the metric, wherein the invert signal has an inverted state and a non-inverted state; and an inverter unit that controls an inverter bit of an output of the buffer based on the invert signal such that an average DC value of the data approaches zero, wherein the inverter bit includes at least two inverter bits.

9. An encoder, comprising:
a buffer that stores data associated with a communication signal;
a DC-Check circuit that computes a metric as a function of the data;
a DC tracking block that generates an invert signal as a function of the metric, wherein the invert signal has an inverted state and a non-inverted state; and
an inverter unit that controls an inverter bit of an output of the buffer based on the invert signal such that an average DC value of the data approaches zero, wherein the metric includes a maximum of an absolute value of a running digital sum.

10. The encoder of claim 9 wherein the running digital sum up to time n is defined as;

$$RDS(T_0, n) = \sum_{i=T_0}^{n} (2x_i - 1), \text{ where } (-\infty < T_0 < 0),$$

$RDS(T_0, n) = RDS(T_o, -1) + RDS(0, n)$ and,
$RDS0 = RDS(T_o, -1)$,
where $x_i$ represents encoder outputs, and RDSO is a state of the DC-Check circuit before new data is entered.

11. The encoder of claim 10 wherein an output of the DC-Check circuit for an input sequence of the data is;

$$RDS\max = \max_{0 \leq n \leq k} \left( \left| \sum_{i=0}^{n} (2x_i - 1) + RDS0 \right| \right),$$

wherein the inverter bit is inserted after k input bits.

12. An encoder, comprising:
a buffer that stores data associated with a communication signal;
a DC-Check circuit that computes a metric as a function of the data;
a DC tracking block that generates an invert signal as a function of the metric, wherein the invert signal has an inverted state and a non-inverted state; and
an inverter unit that controls an inverter bit of an output of the buffer based on the invert signal such that an average DC value of the data approaches zero, wherein the DC-Check circuit includes limiting a maximum DC offset of a filtering operation.

13. The encoder of claim 12 wherein the DC-Check circuit includes:
a low pass filter having a transfer function that complements the filtering operation; and
an absolute value determiner that determines an absolute value of an output of the low pass filter.

14. An encoder, comprising:
a buffer that buffers data associated with a communication signal;
a DC-Check circuit that computes a metric as a function of the data;
a DC tracking block that generates an invert signal as a function of the metric, wherein the invert signal has an inverted state and a non-inverted state; and
an inverter unit, responsive to the invert signal, that controls an inverter bit of an output of the buffer such that an average DC value of the data approaches zero, wherein the metric includes a maximum DC offset for a DC correction circuit.

15. An encoder, comprising:
a buffer that buffers data associated with a communication signal;
a DC-Check circuit that computes a metric as a function of the data;
a DC tracking block that generates an invert signal as a function of the metric, wherein the invert signal has an inverted state and a non-inverted state;
an inverter unit, responsive to the invert signal, that controls an inverter bit of an output of the buffer such that an average DC value of the data approaches zero, wherein the DC-Check circuit includes limiting for a DC correction circuit:
a low pass filter to model the DC correction circuit; and
an offset estimation filter.

16. An encoder, comprising:
a buffer that stores data associated with a communication signal;
a DC-Check circuit that computes a metric as a function of the data;
a DC tracking block that generates an invert signal as a function of the metric, wherein the invert signal has an inverted state and a non-inverted state; and
an inverter unit that controls an inverter bit of an output of the buffer based on the invert signal such that an average DC value of the data approaches zero,
wherein the DC-Check circuit includes threshold limiting based on a number of times the metric is at least one of above and below a threshold.

17. An encoder, comprising:
a buffer that stores data associated with a communication signal;
a DC-Check circuit that computes a metric as a function of the data;
a DC tracking block that generates an invert signal as a function of the metric, wherein the invert signal has an inverted state and a non-inverted state; and
an inverter unit that controls an inverter bit of an output of the buffer based on the invert signal such that an average DC value of the data approaches zero, and wherein the DC-Check circuit includes limiting a maximum DC offset slope change of a running digital sum of the data.

* * * * *

UNITED STATES PATENT AND TRADEMARK OFFICE
CERTIFICATE OF CORRECTION

PATENT NO. : 7,479,904 B1 Page 1 of 1
APPLICATION NO. : 11/729747
DATED : January 20, 2009
INVENTOR(S) : Mats Oberg et al.

It is certified that error appears in the above-identified patent and that said Letters Patent is hereby corrected as shown below:

Column 6, Line 7    Insert -- be -- after "may"

Column 6, Line 16   Delete "DCCI" and insert -- $DCC_i$ --

Signed and Sealed this

Twenty-fourth Day of March, 2009

JOHN DOLL
*Acting Director of the United States Patent and Trademark Office*